United States Patent
Kramer et al.

(10) Patent No.: US 11,117,604 B2
(45) Date of Patent: Sep. 14, 2021

(54) ADJUSTABLE BEACH TRANSPORT WAGON

(71) Applicant: The E.A.C.H. Company LLC, Naperville, IL (US)

(72) Inventors: Curt Adam Kramer, Naperville, IL (US); Blake H. Wagner, Poynette, WI (US)

(73) Assignee: The E.A.C.H. Company LLC, Naperville, IL (US)

(*) Notice: Subject to any disclaimer, the term of this patent is extended or adjusted under 35 U.S.C. 154(b) by 0 days.

(21) Appl. No.: 17/034,003

(22) Filed: Sep. 28, 2020

(65) Prior Publication Data

US 2021/0009178 A1 Jan. 14, 2021

Related U.S. Application Data

(63) Continuation-in-part of application No. 16/272,738, filed on Feb. 11, 2019, now Pat. No. 10,829,137.

(60) Provisional application No. 62/700,068, filed on Jul. 18, 2018.

(51) Int. Cl.
*B62B 3/10* (2006.01)
*B62B 3/00* (2006.01)

(52) U.S. Cl.
CPC .......... *B62B 3/007* (2013.01); *B62B 2202/52* (2013.01)

(58) Field of Classification Search
CPC .. B62B 3/10; B62B 3/108; B62B 3/02; B62B 3/001; B62B 3/002; B62B 3/007; B62B 2202/52; B63B 32/80; B60R 9/08
See application file for complete search history.

(56) References Cited

U.S. PATENT DOCUMENTS

| | | | | |
|---|---|---|---|---|
| 3,706,460 A | * | 12/1972 | Thomas | B62B 3/18 |
| | | | | 280/33.995 |
| 4,056,220 A | * | 11/1977 | Trimble | B63B 34/00 |
| | | | | 224/406 |
| 4,602,802 A | | 7/1986 | Morgan | |
| 5,249,823 A | * | 10/1993 | McCoy | B62B 3/02 |
| | | | | 280/144 |
| 5,823,551 A | * | 10/1998 | Conroy | B63B 32/80 |
| | | | | 280/47.131 |

(Continued)

OTHER PUBLICATIONS

"Aosom Elite II 3-in-1 Double Child Bike Trailer and Stroller—Yellow/Black," Google Shop, downloaded Sep. 25, 2020.

*Primary Examiner* — John D Walters
(74) *Attorney, Agent, or Firm* — Stiennon & Stiennon

(57) ABSTRACT

A wagon for transporting beach articles and elongated water sport boards has a bed with a peripheral frame with two cross tubes beneath a bottom wall. The frame is carried on front and rear wheel assemblies. Front and rear walls are mounted to the frame, and side walls are adjustably positioned with respect to the frame. Each side wall has two tubular extensible support members which telescope within the frame cross members. When a side wall is positioned outwardly, the extensible support members are positioned to receive a water sport board thereon, such that it extends through front and rear slots defined between the front and rear walls and the extended side wall. A latch is associated with each side wall and actuatable to alternatively secure or release the wall. The latch may be a clamp with an elastomeric plug expandable from an extensible support member withing a cross member.

17 Claims, 5 Drawing Sheets

(56) References Cited

U.S. PATENT DOCUMENTS

| | | | |
|---|---|---|---|
| 6,142,492 A | 11/2000 | DeLucia | |
| 6,206,385 B1* | 3/2001 | Kern | B62B 3/02 |
| | | | 280/47.35 |
| 6,457,619 B1* | 10/2002 | Werner | B60P 3/40 |
| | | | 224/405 |
| 6,962,370 B2* | 11/2005 | Simpson | B62D 63/061 |
| | | | 280/47.34 |
| 7,017,940 B2 | 3/2006 | Hatfull | |
| 7,070,196 B1* | 7/2006 | Larsen | B60P 3/1066 |
| | | | 211/70.5 |
| 7,963,530 B1 | 6/2011 | Garcia | |
| 8,141,888 B1* | 3/2012 | Levasa | B62B 3/02 |
| | | | 280/79.7 |
| 8,465,031 B2* | 6/2013 | Coghill, Jr. | B62B 1/14 |
| | | | 280/79.3 |
| 9,221,484 B2* | 12/2015 | Logvin | B62B 3/007 |
| D757,388 S | 5/2016 | Rocha | |
| 2020/0023877 A1 | 1/2020 | Kramer | |

* cited by examiner

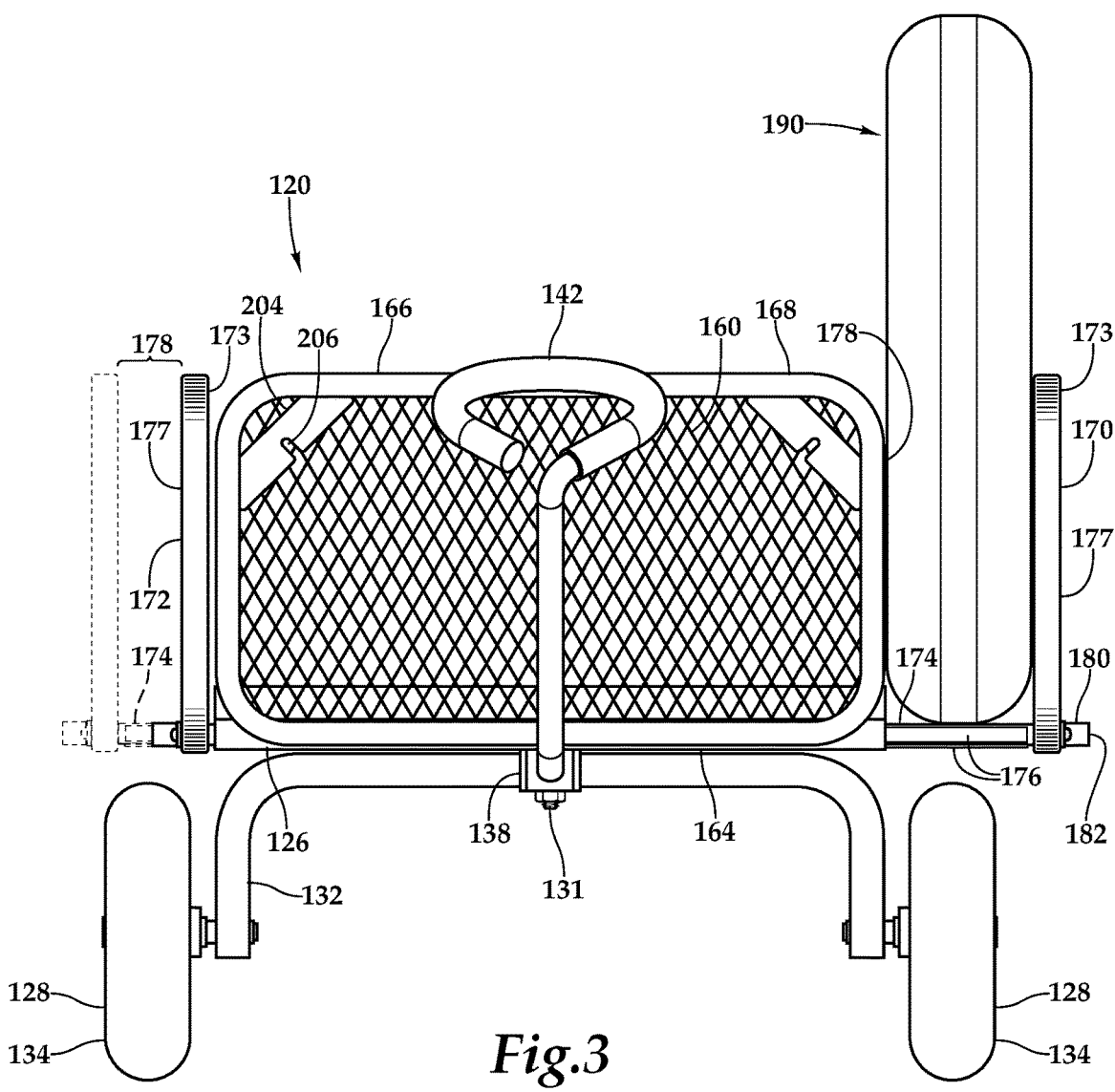
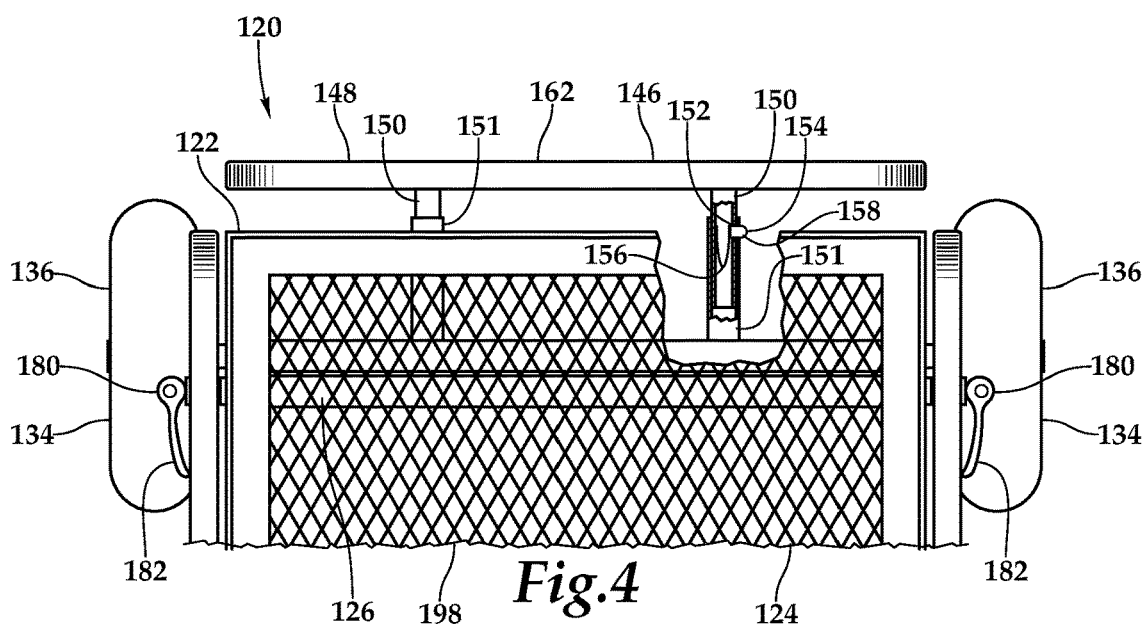

ADJUSTABLE BEACH TRANSPORT WAGON

CROSS REFERENCES TO RELATED APPLICATIONS

This application is a continuation-in-part application of U.S. application Ser. No. 16/272,738, filed Feb. 11, 2019, which claims the benefit of priority of U.S. App. No. 62/700,068, filed Jul. 18, 2018, the disclosures of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

This invention relates to a beach wagon that is manually steerable, and has an open-top container for receiving goods, and a provision for carrying water sport boards.

Recreational activities on a beach frequently require hauling food, coolers, beach chairs, sporting equipment, umbrellas, and supplies over distances which are sometimes not able to be conveniently traversed by an automobile. Carrying such articles can be tiring, especially on sand in hot summer weather. Furthermore, with the popularity of water sport boards, the ability to hand carry all of this gear can be overwhelming.

It has heretofore been known to provide a wagon outfitted for transporting articles to and onto the beach. What is needed is a wagon which can transport both small articles and large articles such as water sport boards.

SUMMARY OF THE INVENTION

The wagon of this invention is configured for transporting smaller articles as well as elongated water sport boards. A frame is carried on two wheel assemblies, one which is pivotable with a handle for steering of the wagon, and the other which is fixed to the frame. Two tubular cross members extend beneath a bed defined by a frame and a bottom wall. The front and back walls are mounted to the bed, and two side wall assemblies are positioned on either side of the bed extending between the front and the rear wall. The side wall assemblies have side walls which are supported on two extensible support members which telescope within the cross members. The wagon may be employed with the side assemblies collapsed against the bed when it is not necessary to transport a water sport board. By releasing latches, the side wall assemblies may be repositioned to expand the side walls away from the bed, thereby defining slots in the front and back of the wagon between the side wall and the front and back walls. The extensible support members then provide support surfaces to receive a water sport board thereon and to carry the board between the side wall and the bed. Thus the same wagon may be adjustably configured to transport no water sport boards or to carry one or two.

The walls of the wagon may be provided with fabric sleeves with pockets to retain loose articles.

It is an object of the present invention to provide a wagon which can carry small items as well as large water sports boards.

It is a further object of the present invention to provide a wagon which is adjustable to receive one or two large water sport boards.

It is an additional object of the present invention to provide a wagon which is adjustable to carry water sport boards of different widths.

Further objects, features and advantages of the invention will be apparent from the following detailed description when taken in conjunction with the accompanying drawings.

BRIEF DESCRIPTION OF THE DRAWINGS

FIG. 3 is a front elevational view of the wagon of FIG. 2 with a water sport board carried thereon, and shown with a side wall in an alternative expanded position in phantom view.

FIG. 4 is fragmentary top view of the wagon of FIG. 3 illustrating the rear portion thereof, and partially broken away in section to illustrate the attachment mechanism of the rear wall.

DESCRIPTION OF THE PREFERRED EMBODIMENTS

Figure 1:
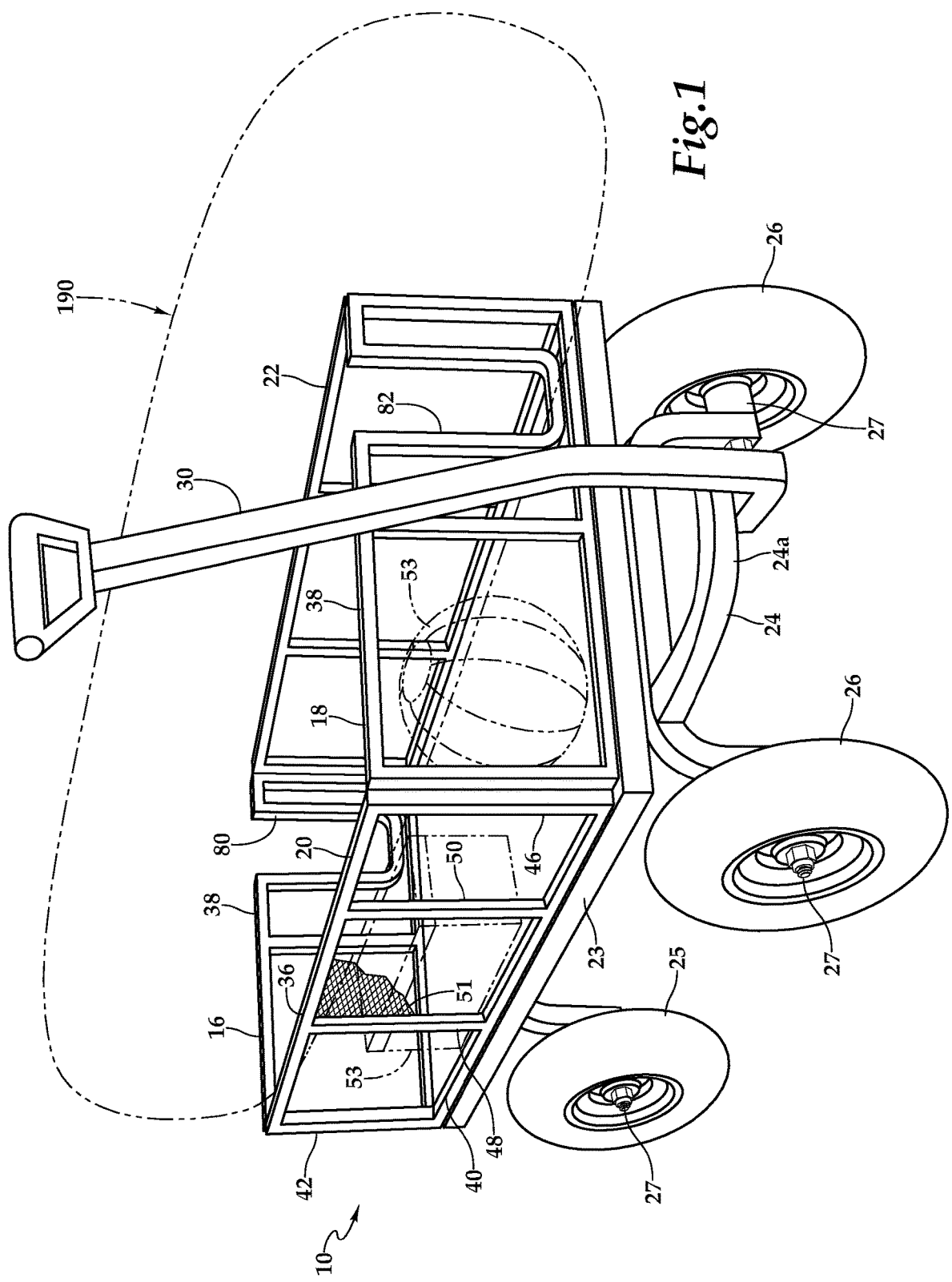
FIG. 1 is a side perspective view of a wagon of this invention with a water sport board and beach equipment shown therein in phantom view.

Referring more particularly to FIGS. 1-7, wherein like numbers refer to similar parts, a beach wagon 10 is shown in FIG. 1. The wagon 10 includes a rear wall 16, a front wall 18, a right side wall 20 and a left side wall 22. The walls 16, 18, 20, 22 are all removably attached to a framed floor 23. The framed floor 23 is carried by a chassis 24 which is carried by rear wheels 25 and front wheels 26, rotatably carried on spindles 27 of the chassis. The wheels 25, 26 include tires that are suitably sized for use on sand at the beach and can be held on the chassis spindles by cotter pins (not shown). A pull handle 30 is attached to the chassis 24. A front portion 24a of the chassis 24 that is carried by the front wheels 26 is pivotally attached to the framed floor 23 such that the front wheels can be turned and the wagon 10 steered by selective movement of the handle 30.

Although four wheels are shown, it is also encompassed by the invention that only rear wheels are used and the front is lifted and pulled to transport the wagon. Alternately, three wheels can be used with a single front wheel.

The walls 16, 18, 20, 22 and the floor 23 form an open top container having the approximate dimensions of 22.5 inches wide, 44 inches long and 10 inches deep.

Each of the walls 16, 18, 20, 22 has a surrounding frame 36. Each frame includes a top bar 38, a bottom bar 40, a first side bar 42, and a second side bar 46. One or more intermediate vertical bars 48, 50 can be incorporated into the frame 36 for added rigidity. Each wall 16, 18, 20, 22 can have a mesh 51 that closes the open areas within the frame 36. For simplicity, only a small portion of the mesh is shown.

This mesh helps to contain articles 53 on the framed floor 23 within the wagon, preventing such articles from spilling out of the wagon.

Each wall 16, 18, 20, 22 is fastened along its bottom bar 40 by releasable attachments (not shown). The frames 36 of adjacent walls are releasably fastened together adjacent to the top bar 38 of each adjacent wall with a releasable attachment mechanism (not shown).

While the top bars 38 of the sidewalls 20, 22 are substantially linear throughout, top bars 38 of the rear wall 16 and of the front wall 18 are indented to create retaining slots 80, 82 respectively.

The retaining slots 80, 82 are substantially U-shaped and provide an area 170 for receiving a water sport board such as a surfboard, a paddleboard, a wake board, a wind sailing board, a wave board, etc. In an exemplary embodiment the slot 82 has a vertical depth of about 10 inches and a horizontal width of about 6 inches. To protect water sport boards from being scratched, a soft liner (not shown) can be applied over the surface of the top bar 38 within the slot 82. A bottom portion of the slot 80 can be rounded to further protect water sport boards having a rounded profile.

The wagon 10 may convey a water sport board 190 in the slots 80, 82. Because the slots 80, 82 are inboard of, or between the rear wheels 25 and the front wheels 26 the wagon has a more stable center of gravity with the water sport board loaded onto the wagon.

The embodiments of the walls of the present invention can be composed of known materials for wagons, such as steel or plastic frame elements, and steel or plastic mesh, or any material suitable for the application.

Figure 2:
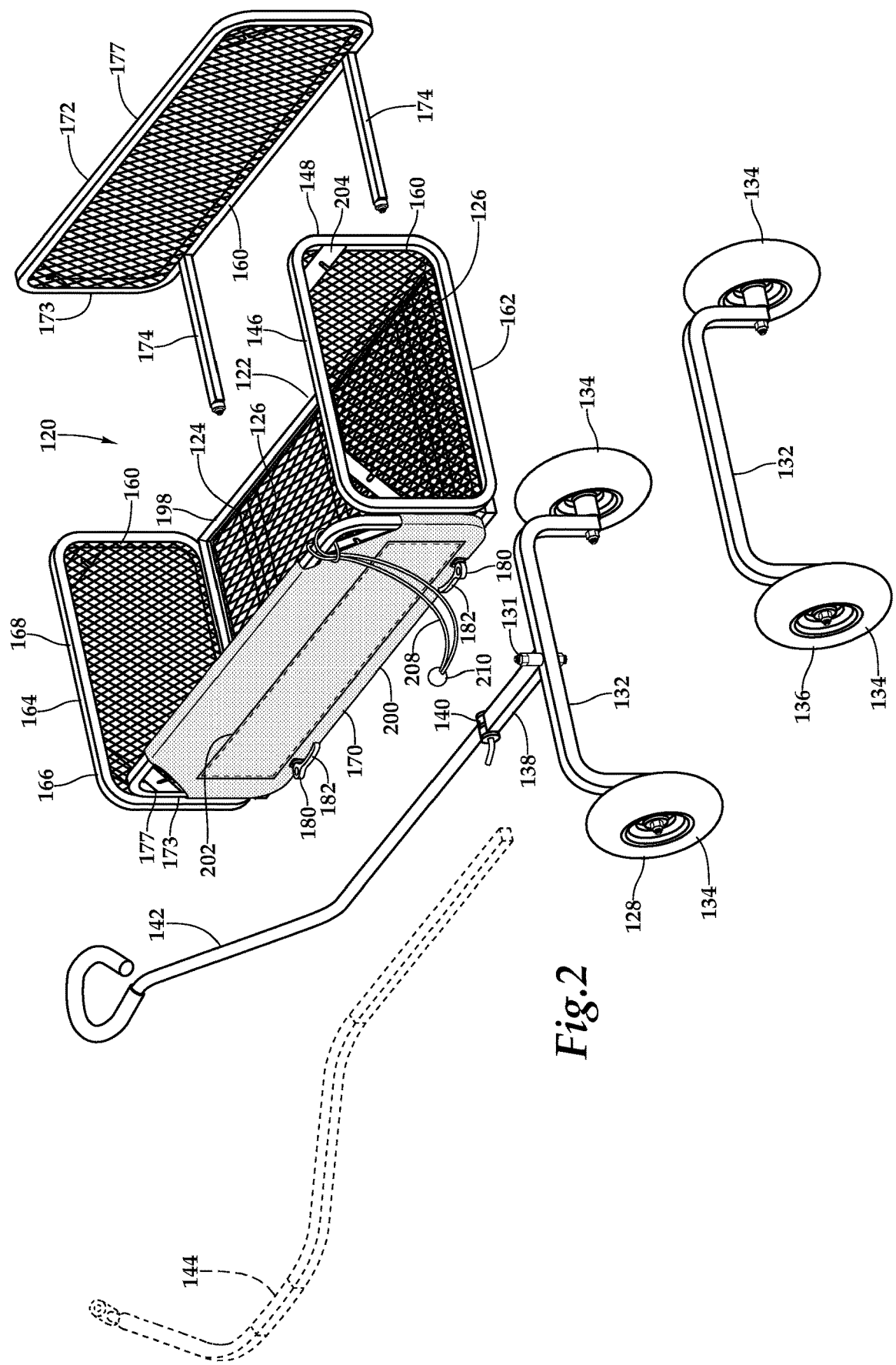
FIG. 2 is an exploded isometric view of an alternative wagon of this invention with adjustable side walls, with an alternative bicycle tow arm shown in phantom view.

An alternative embodiment beach wagon 120 is shown in FIGS. 2-6 which is adjustable to carry one, two, or no water sport boards 190. The wagon 120 has a bed 198 with a bed peripheral frame 122 and a bottom wall 124. The bed peripheral frame 122 may be formed of welded steel angles and the bottom wall 124 is fixed to the bed frame 122 and may be formed of perforated material such as steel expanded metal sheet. Three cross members 126 are welded beneath the bed peripheral frame. Each cross member 126 is preferably a square steel tube, and the frontmost and rearmost cross members also serve to receive extensible support members from the side walls as described below. As shown in FIG. 2, a front wheel assembly 128 is pivotably mounted to a frontward cross member 126, such as by a vertical bolt 131. The front wheel assembly 128 has an inverted U-shaped frame member 132, to which are mounted two wheels 134. A rear wheel assembly 136 is fixed to a rearmost cross member 126, such as being bolted thereto. The rear wheel assembly 136 has a frame member 132 with two wheels 134. A forward extension tube 138 is mounted to the front wheel assembly 128 frame and extends forward to project beyond the bed frame 122. The forward extension tube has a quick disconnect mount 140 by which a pull handle 142 or a bicycle tow handle 144 may be alternatively connected, by which the wagon 120 may be pulled and steered. When desired to pull the wagon 120 behind a bicycle, the pull handle 142 is removed and replaced with the bicycle tow handle 144 which is connected to the rear of the bicycle.

As shown in FIG. 4, a rear wall assembly 146 has a tubular wall frame 148 with two frontwardly extending mounting arms 150 which extend into rearwardly opening square tubes 151 which are welded to the rearmost cross member 126. Each mounting arm 150 has a sidewardly opening hole 152 and a detent 154 mounted on a spring 156 within the mounting arm to project through the hole 152 and to be received within a similar hole 158 in the rearwardly opening tube 151. This arrangement allows the rear wall assembly 146 to be detached from the wagon by depressing the detent 154. The rear wall frame 148 together with an expanded metal element 160 defines a rear wall 162.

A front wall assembly 164, shown in FIG. 3, has similar mounting arms and detent arrangement (not shown) to mount the front wall assembly to the front of the peripheral bed frame 122. The front wall assembly 164 has a front wall frame 166 which together with an expanded metal element 160 defines a front wall 168. The front wall assembly 164 and rear wall assembly 146 may be detached from the bed 198 for compact shipping or storage.

As shown in FIG. 3, the wagon 120 has a first side wall assembly 170 and a second wall assembly 172 which are identical. Each has a wall frame 173 formed of bent square steel tubing and which with an expanded metal element 160 defines a side wall 177.

Each side wall assembly 170, 172 has two parallel extensible support members 174 which are fixed to the side wall frame 173 and which extend into a mating one of the cross members 126 in a telescoping arrangement. The support members 174 are square steel tubing which is smaller in cross section that the tubing of the cross members 126. The support members 174 of the opposed first and second side wall assemblies 170, 172 are preferably aligned with one another so that they extend into opposite sides of the same cross members 126. Hence the length of each support members will be preferably be less than half the width of the bed peripheral frame.

Figure 5:
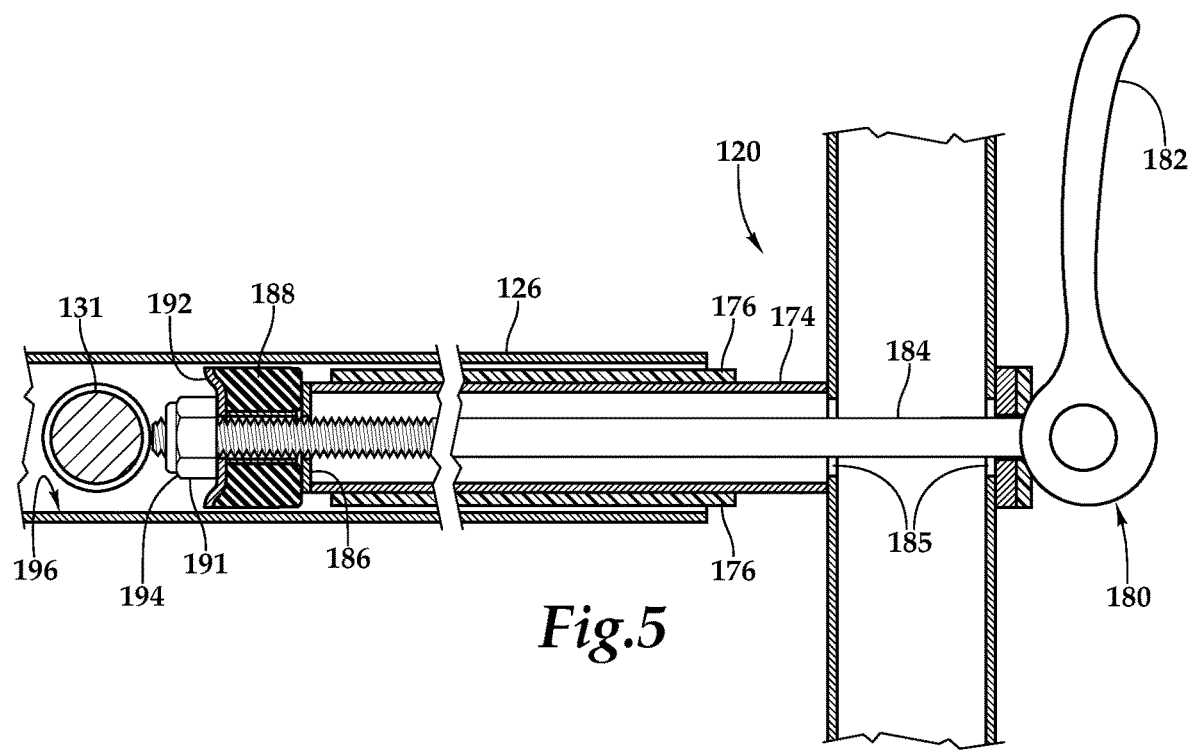
FIG. 5 is a fragmentary cross-sectional view of the wagon of FIG. 4, showing the side wall clamping mechanism in a released configuration.

To facilitate the smooth insertion of the support members 174 within the cross members 126, low friction slip strips 176 may be adhesively attached to the underside and sides of the extensible support members 174 as shown in FIGS. 3 and 5. The slip strips 176 may be formed of, for example UHMW plastic.

As shown in FIG. 3, the first side wall and the second side wall 177 are extendable sidewardly of the bed peripheral frame 122 on the extensible support members to support a water sport board 190 thereon, such that when the one of the side walls is spaced sidewardly from the bed peripheral frame, slots 178 are defined between a side wall and the front wall 168 and the rear wall 162, such that the water support board may extend through the slots and across the extensible support members 174.

Figure 6:
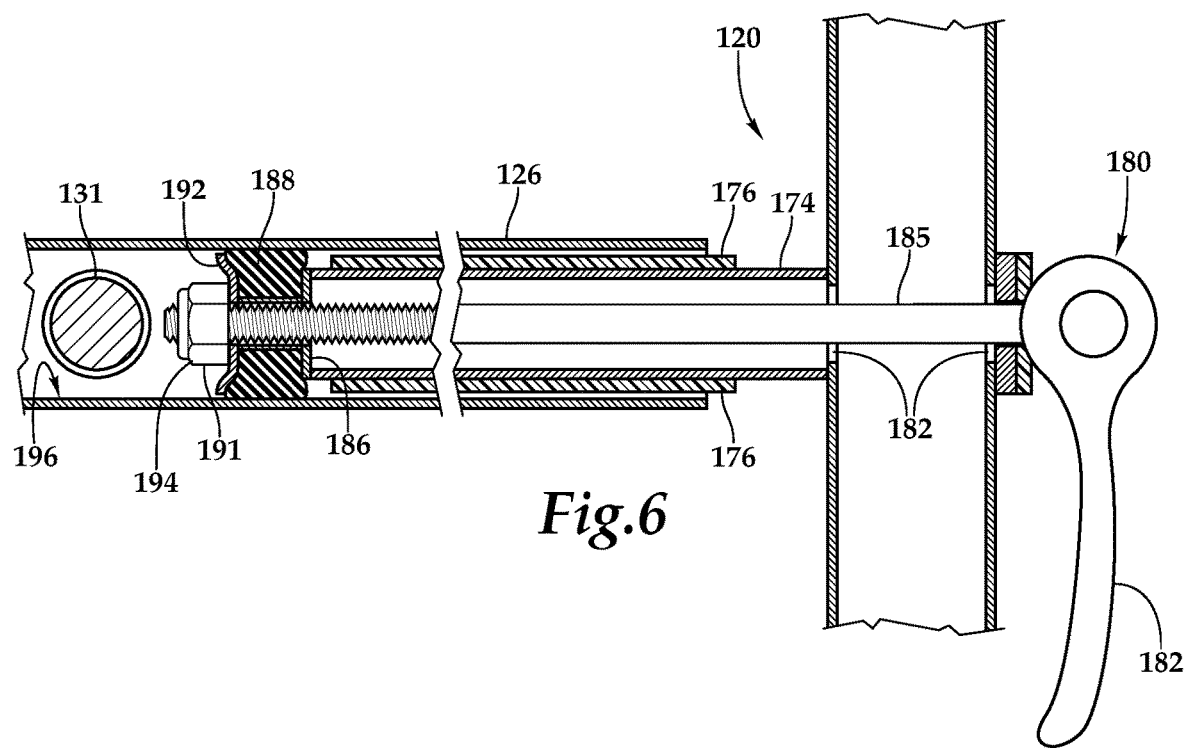
FIG. 6 is a fragmentary cross-sectional view of the wagon of FIG. 5, showing the clamping mechanism in a secured configuration.

A latch 180 is provide associated with each of the first side wall assembly 170 and the second side wall assembly 172 which is actuatable to alternatively secure a side wall with respect to the peripheral frame 122, or to release the side wall for adjustable positioning closer or further from the peripheral frame. The latch may be a cotter pin which extends into alignable holes within the tubing of an extensible support member and a cross member 126, a ball detent arrangement such as disclosed with respect to the rear wall assembly, or other engagable mechanical connection which secures the side wall in a desired position. In a preferred embodiment, the latch 180 is provided with each extendable support member to allow selected positioning of the side walls as desired to suit the width of a particular sport board, as best shown in FIGS. 5 and 6.

The latch 180, for example, has a clamping handle 182 which is positioned sidewardly of a lower member of one of the tubular side wall frames 173. A threaded rod 184 extends from the clamping handle 182 through holes 185 in the side wall frame 173 into the extensible support member 174 and protrudes through a hole in an end plate 186 which caps the extensible support member. The threaded portion of the rod extends beyond the end plate 186 and within the cross member 126 and an elastomeric plug 188 is mounted to this portion of the rod. An end assembly 191 has a dished washer 192 which abuts the elastomeric plug 188, and the washer and plug are held in place with a nut 194, such as a nylon-insert locknut.

The end assembly 191 is thus secured to the rod 184 and moves axially when the rod is actuated. When the clamping handle 182 is moved from a release position as shown in FIG. 5 to a clamped position as shown in FIG. 6, the cam action of the handle 182 draws the rod 184 outwardly, thereby urging the plug against the end plate 186 of the extensible support member 174, and thereby compressing the elastomeric plug 188 and causing it to expand radially against an interior wall 196 of the cross member 126, thereby securing the extensible support member to the cross tube and the peripheral frame, and retaining the side wall in a desired position.

As shown in FIG. 2, although the side walls and the expanded metal elements retain articles within a bed 198 defined between the front, rear, side and bottom walls. The front, rear, and side walls may be wrapped with fabric sleeves 200. Although only one side wall is illustrated with a sleeve for clarity, all the upwardly extending walls may be provided with sleeves 200. Each sleeve 200 may be provided with one or more pockets 202 permitting the conveying of small objects or other items not effectively retained within an open bed. The sleeves 200 may be provided with hook and loop fasteners along one margin of a wall to allow them to be removed and reattached.

The front wall, the rear wall, the first side wall and the second side wall frames have angled metal plates extending across the upper corners which define gussets 204 having a downwardly opening slot 206 for the receipt therein of a retaining cord 208. The retaining cords 208 are resilient members which are terminated with a ball 210, and may be knotted around the tubular member of a side wall and then passed over a supported water sport board 190 and through a gusset slot 206, and retained by the terminal ball 210, thereby assisting in the stabilizing of the sport board within the slots.

Figure 7:
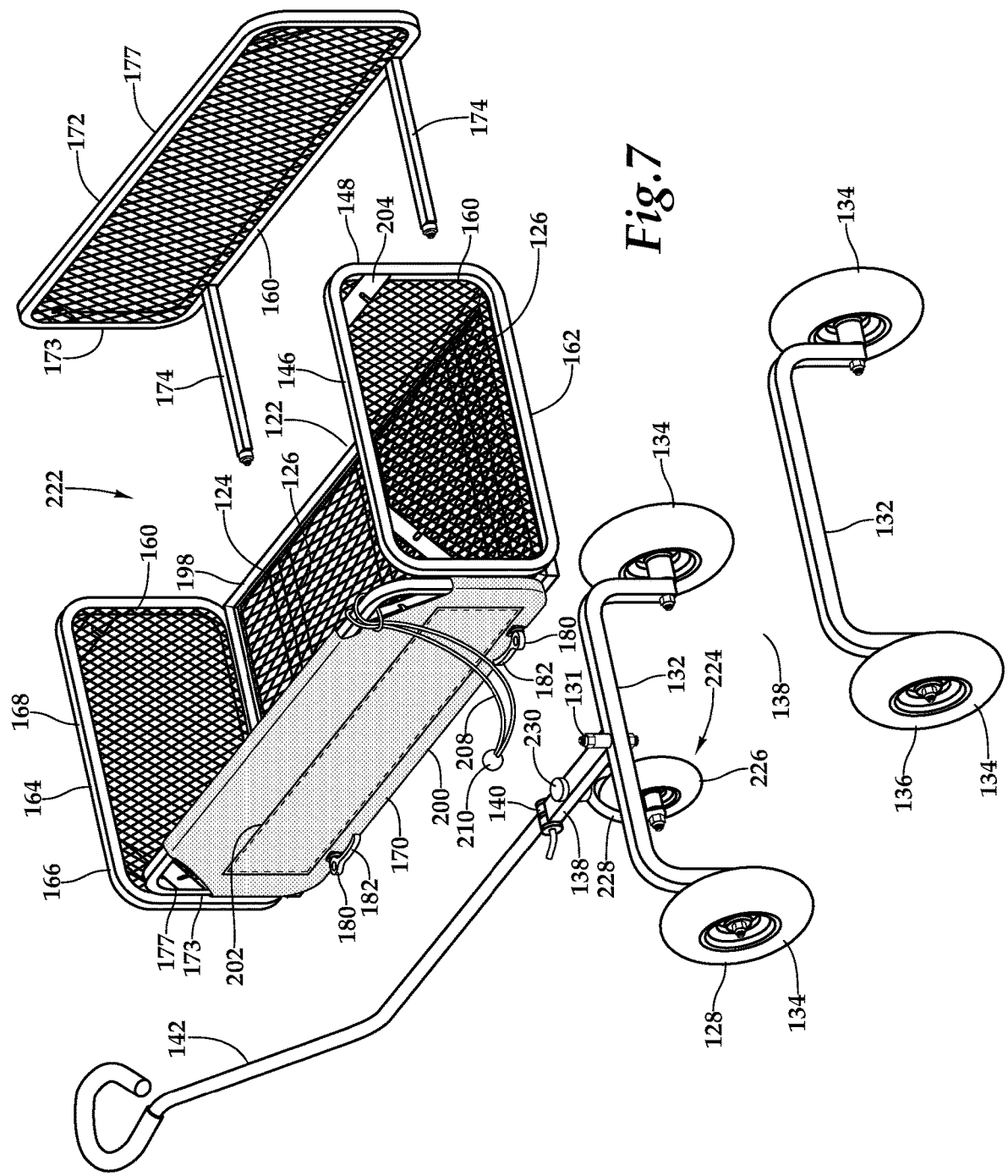
FIG. 7 is an exploded isometric view of an alternative embodiment wagon of this invention having a stability assembly mounted to the front extension tube.

An alternative embodiment wagon 222 is shown in FIG. 7, which is similar to the wagon 120, but includes a stability wheel assembly 224 mounted to the forward extension tube 138. The stability wheel assembly 224 has a wheel 226, which is preferably smaller than the wheels 134 and is rotatably mounted to a yoke 228 which is mounted to rotate around a vertical axis by a fitting 230 connected to the forward extension tube 138. The stability wheel assembly 224 supports the front wheel assembly 128 when it is rotated substantially from the front to back direction getting close to 90 degrees, to resist tipping of the wagon bed.

It is understood that the invention is not limited to the particular construction and arrangement of parts herein illustrated and described, but embraces all such modified forms thereof as come within the scope of the following claims.

We claim:

1. A wagon for transporting beach-related articles and elongated water sport boards, comprising:
    a chassis;
    a plurality of wheels mounted beneath the chassis;
    a box mounted to the chassis above the wheels, the box having a lower floor, and walls extend upwardly from the floor, wherein each wall comprises a barrier for retaining beach-related articles within the wagon, wherein the walls define a first portion and a second portion, and wherein the first portion has elements defining a front tubular bar and a rear tubular bar, and the walls define a second portion which is spaced sidewardly from the first portion and which has a front tubular bar and a rear tubular bar, wherein the first portion front tubular bar is spaced sidewardly from the second portion front tubular bar to define a front slot, and the first portion rear tubular bar is spaced sidewardly from the second portion rear tubular bar to define a rear slot, the tubular bars which define the slots being substantially vertical and parallel; and
    wherein the rear slot is spaced rearwardly of the front slot, and wherein a water sport board is engageable with the wagon such that the board extends within the front slot and the rear slot so that portions of the board extend between and beyond the box.

2. The wagon of claim 1 further comprising a pull handle connected to the chassis and extending upwardly in front of the front wall, wherein the front slot and the rear slot are positioned sidewardly of the upwardly extending pull handle, such that the elongated sport board does not interfere with the pull handle.

3. The wagon of claim 1 wherein the box walls first portion comprises a front wall and a rear wall which extend upwardly from a bed; and the box walls second portion comprises a first side wall which is adjustably engaged with the bed, and wherein the first portion front tubular bar is part of the front wall and the first portion rear tubular bar is part of the rear wall, and the walls second portion front tubular bar and rear tubular bar are each a part of the first side wall, the front slot and the rear slot being defined between the first side wall and the front and rear walls, and the first side wall is extendable from the bed to adjust a size of the front slot and the rear slot.

4. The wagon of claim 3 further comprising a second side wall which is adjustably engaged with the bed and positioned parallel to and opposite the first side wall and extending between the front wall and the rear wall, the second side wall being adjustable to be spaced sidewardly from the front wall and the rear wall to define a second front slot and a second rear slot, such that a water support board can be received therein.

5. The wagon of claim 1 wherein the plurality of wheels mounted beneath the chassis includes a front wheel assembly having two front wheels mounted in a frame which is pivotable with respect to the bed, and further comprising:
    a forward extension tube extending forward from the front wheel assembly frame; and
    a stability wheel assembly comprising a yoke mounted to the forward extension tube to rotate around a vertical axis, and a wheel mounted within the yoke to rotate about a horizontal axis, wherein the stability wheel assembly supports the front wheel assembly when it is rotated substantially from the front to back direction, to resist tipping of the wagon bed.

6. A wagon for transporting articles and elongated water sport boards, comprising:
    a frame having a plurality of wheels mounted thereto and including a front wheel assembly and a rear wheel assembly positioned rearwardly from the front wheel assembly, wherein portions of the frame define at least one cross member extending transverse to a front to back direction;
    a bed connected to the frame and having a bottom wall;
    an upwardly extending front wall mounted to the frame;
    an upwardly extending rear wall mounted to the frame rearwardly of the front wall;

a first side wall mounted to the frame between the front wall and the rear wall;

a second side wall mounted to the frame between the front wall and the rear wall, with the bed being positioned between the first side wall and the second side wall;

at least one extensible support member extending from the first side wall into the at least one cross member, the support member being extendable sidewardly of the bed to support a water sport board thereon, such that when the first side wall is spaced sidewardly from the bed, slots are defined between the first side wall and the front wall and between the first side wall and the rear wall, such that a water support board may extend through said slots and across the at least one extensible support member; and a latch which is actuatable to alternatively secure the at least one extensible support member to the frame, or to release the at least one extensible support member for adjustable positioning of the first side wall closer or further from the bed.

7. The wagon of claim 6 wherein the at least one cross member of the frame comprises a first cross tube positioned frontwardly of a second cross tube, and wherein the at least one extensible support member extending from the first side wall comprises two extensible support members extending from the side wall, the two extensible support members being received within the first cross tube and the second cross tube.

8. The wagon of claim 6 further comprising:

at least one second extensible support member extending from the second side wall into the at least one cross member, the second extensible support member being extendable sidewardly of the bed to support a water sport board thereon, such that when the second side wall is spaced sidewardly from the bed, slots are defined between the second side wall and the front wall and between the second side wall and the rear wall, such that a water support board may extend through said slots and across the at least one second extensible support member; and a latch which is actuatable to alternatively secure the at least one second extensible support member to the frame, or to release the at least one second extensible support member for adjustable positioning of the second side wall closer or further from the bed.

9. The wagon of claim 6 further comprising a fabric sleeve surrounding the first side wall and having portions thereon defining a pocket.

10. The wagon of claim 6 wherein at least one of the front wall, the rear wall, the first side wall and the second side wall has portions defining a gusset having a downwardly opening slot for the receipt therein of a retaining cord.

11. The wagon of claim 6 wherein the at least one extensible support member comprises a hollow tube, and wherein the latch comprises:

a clamping handle positioned sidewardly of a lower member of the first side wall;

a rod which extends from the clamping handle and into the at least one extensible support member, wherein the rod protrudes from the at least one extensible support member at a position within at least one cross member of the frame;

an elastomeric plug mounted to the rod where it protrudes from the at least one extensible support member within the at least one cross member; and an end assembly mounted to the rod exterior to the at least one extensible support member, wherein the end assembly has portions which engage against the plug, such that actuation of the clamping handle draws the plug against an end of the extensible support member thereby compressing the elastomeric plug and causing it to expand radially against an interior wall of the at least one cross member, thereby securing the at least one extensible support member to the frame.

12. The wagon of claim 6 wherein the front wheel assembly has two front wheels mounted in a frame element which is pivotable with respect to the bed, and further comprising:

a forward extension tube extending forward from the front wheel assembly frame element; and a stability wheel assembly comprising a yoke mounted to the forward extension tube to rotate around a vertical axis, and a wheel mounted within the yoke to rotate about a horizontal axis, wherein the stability wheel assembly supports the front wheel assembly when it is rotated substantially from the front to back direction, to resist tipping of the wagon bed.

13. A wagon for transporting articles and elongated water sport boards, comprising:

a bed comprising a peripheral frame and a bottom wall;

a first cross tube fixed to the peripheral frame;

a second cross tube fixed to the peripheral frame rearwardly of the first cross tube, the second cross tube thus spaced from the first cross tube in a front to back direction, wherein the cross members extend transverse to the front to back direction;

a front wheel assembly pivotably mounted to the first cross tube;

a rear wheel assembly fixedly mounted to the second cross tube;

an upwardly extending front wall mounted frontwardly of the peripheral frame;

an upwardly extending rear wall mounted rearwardly of the peripheral frame;

a first side wall positioned between the front wall and the rear wall;

a second side wall mounted between the front wall and the rear wall, with the bed being positioned between the first side wall and the second side wall;

two extensible support members extending from the each of the first side wall and the second side wall, wherein each extensible support member is a tube which extends into one of the cross members, and wherein the first side wall and the second side wall are extendable sidewardly of the bed on the extensible support members to support a water sport board thereon, such that when the one of the side walls is spaced sidewardly from the bed, slots are defined between said side wall and the front wall and the rear wall, such that a water support board may extend through said slots and across the extensible support members; and a latch associated with each of the first side wall and the second side wall which is actuatable to alternatively secure said side wall with respect to the peripheral frame, or to release the side wall for adjustable positioning closer or further from the peripheral frame.

14. The wagon of claim 13 further comprising a fabric sleeve surrounding the first side wall and having portions thereon defining a pocket.

15. The wagon of claim 13 wherein at least one of the front wall, the rear wall, the first side wall and the second side wall has portions defining a gusset having a downwardly opening slot for the receipt therein of a retaining cord.

16. The wagon of claim 13 wherein each extensible support member comprises a hollow tube, and wherein each latch comprises:
- a clamping handle positioned sidewardly of a lower member of one of the side walls;
- a rod which extends from the clamping handle and into one of the extensible support members, wherein the rod protrudes from said extensible support member at a position within the cross tube within which it extends;
- an elastomeric plug mounted to the rod where it protrudes from said extensible support member within said cross tube; and
- an end assembly mounted to the rod exterior to the said extensible support member and the end assembly having portions which engage against the plug, such that actuation of the clamping handle draws the plug against an end of said extensible support member thereby compressing the elastomeric plug and causing it to expand radially against an interior wall of the said cross tube, thereby securing said extensible support member to the cross tube and the peripheral frame.

17. The wagon of claim 13 wherein the front wheel assembly has two front wheels mounted in a frame element, and further comprising:
- a forward extension tube extending forward from the front wheel assembly frame element; and
- a stability wheel assembly comprising a yoke mounted to the forward extension tube to rotate around a vertical axis, and a wheel mounted within the yoke to rotate about a horizontal axis, wherein the stability wheel assembly supports the front wheel assembly when it is rotated substantially from the front to back direction, to resist tipping of the wagon bed.

* * * * *